United States Patent
Bhatia et al.

(10) Patent No.: US 9,042,880 B2
(45) Date of Patent: May 26, 2015

(54) METHOD AND APPARATUS FOR UPLOADING CONTENT OVER WIRELESS NETWORKS

(75) Inventors: Randeep S Bhatia, Green Brook, NJ (US); Arupjyoti Bhuyan, Naperville, IL (US); Olivier Bernard Henri Clarisse, DesPlaines, IL (US); Girija J. Narlikar, Mumbai (IN)

(73) Assignee: Alcatel Lucent, Boulogne-Billancourt (FR)

( * ) Notice: Subject to any disclaimer, the term of this patent is extended or adjusted under 35 U.S.C. 154(b) by 518 days.

(21) Appl. No.: 12/316,469

(22) Filed: Dec. 12, 2008

(65) Prior Publication Data

US 2010/0151851 A1    Jun. 17, 2010

(51) Int. Cl.
*H04W 24/06* (2009.01)
*H04L 29/08* (2006.01)
*H04M 1/725* (2006.01)

(52) U.S. Cl.
CPC ........... *H04L 67/06* (2013.01); *H04M 1/72522* (2013.01); *H04M 2250/64* (2013.01); *H04W 24/06* (2013.01)

(58) Field of Classification Search
None
See application file for complete search history.

(56) References Cited

U.S. PATENT DOCUMENTS

| | | | |
|---|---|---|---|
| 2003/0112774 A1* | 6/2003 | Bender et al. | 370/328 |
| 2008/0244040 A1* | 10/2008 | Bhatia et al. | 709/219 |
| 2009/0129345 A1* | 5/2009 | Wu et al. | 370/337 |
| 2010/0091758 A1* | 4/2010 | Goteti et al. | 370/345 |

* cited by examiner

*Primary Examiner* — Mehmood B Khan
(74) *Attorney, Agent, or Firm* — D. M. LaBruno

(57) ABSTRACT

Method and apparatus for uploading content from a user terminal in response to a request triggered at the user terminal to upload content is provided. An exemplary method includes initiating a test call at the user terminal to a wireless network in response to an indication to upload content from the user terminal, obtaining user-channel information for the test call and network-level state information for the user terminal during the test call, determining whether a user-channel condition and a network-level condition are satisfied based on the user-channel information and network-level state information respectively, and uploading the content to the wireless network in response to the user-channel condition and the network-level condition being satisfied. The user terminal obtains at the user terminal user-level state information and triggers the indication to upload content from the user terminal if the user-level condition is determined to be satisfied.

19 Claims, 3 Drawing Sheets

METHOD AND APPARATUS FOR UPLOADING CONTENT OVER WIRELESS NETWORKS

FIELD OF THE INVENTION

The invention relates to the field of communication networks and, more specifically, to uploading content from a wireless terminal over wireless networks.

BACKGROUND INFORMATION

Various applications permit wireless subscribers to make content stored in their end equipments available to others. For example, a wireless subscriber may wish to provide from her wireless content, such as text, images, audio, video, and the like, to other wireless users and content aggregators over wireless networks. For instance, a wireless subscriber may wish to share photographs or video with a friend or service provider such as a news outlet or photograph print shop.

Existing mobile content upload schemes utilize static schedules for delivering content from wireless users regardless of the state of the subscriber's terminal equipment and regardless of temporal and spatial variations in the wireless network. Such schemes result in inefficient user terminal resource utilization, poor user experience, and inefficient wireless network utilization. Specifically, user terminal resources may be degraded by performing a content upload during an inopportune time for the user. Further, content upload during periods when the user has poor channel quality or when network resources are heavily utilized by real-time services may result in the user terminal battery being drained due to the extended time during which content is communicated from the user terminal as necessitated by communication errors. Also, content upload during periods of high network utilization (i.e, heavy load) may adversely affect the bandwidth of other users.

In addition static content upload schemes may require manual user intervention to reinitiate content delivery when a network connection is lost during upload or to select an appropriate time/place after a network connection can be obtained to initiate content upload. As a result, the user may not only suffer a poor user experience with her wireless terminal but additionally may waste precious network resources by multiple retransmission/s of content. Thus, existing mobile content upload schemes negatively impact performance perceived by wireless users utilizing such services, as well as wireless users utilizing other services.

SUMMARY OF THE INVENTION

A method and apparatus for uploading content from a user terminal in response to a user triggered request to upload content is provided. The provided method enables a wireless terminal to optimally upload contents via a wireless network to an application server depending on conditions for the wireless terminal and while minimizing impact on the provider's network bandwidth availability.

An exemplary method includes initiating a test call at the user terminal to a wireless network in response to an indication to upload content from the user terminal, obtaining user-channel information for the test call and network-level state information for the user terminal during the test call, determining whether a user-channel condition and a network-level condition are satisfied based on the user-channel information and network-level state information respectively, and uploading the content to the wireless network in response to the user-channel condition and the network-level condition being satisfied. The user terminal may obtain its user-level state information and trigger the indication to upload content from the user terminal if a user-level condition is determined to be satisfied.

In a further embodiment, the user-level state information for the user terminal includes a user terminal power state, a user terminal battery power status, a user terminal time-of-day status, a user terminal location status, a user terminal memory status, a user terminal capability status, and user subscription information.

In another embodiment, the user-channel information is a user channel quality for the test call, which may be checked to determine whether a user channel quality condition is satisfied by the test call and thus whether content upload should proceed.

In one embodiment, the network-level state information is information related to the content server that is to receive uploaded content from the user terminal, which information is received at the user terminal from the wireless network during the test call and checked to determine whether a server condition is satisfied and thus whether content upload should proceed. In another embodiment, the network-level state information is cell utilization information for a cellular region associated with the user terminal during the test call, which is received at the user terminal from the wireless network during the test call and checked to determine whether a cell utilization condition is satisfied and thus whether content upload should proceed. Content upload proceeds with request and connection, if available, to the network for transfer of the content. The test call and upload of content may be considered as a part of a single Multiple Packet Data Protocol (PDP) call with the check of a portion of the network level conditions, e.g., cell utilization, occurring during the request for content transfer itself.

In other embodiments, once begun, content upload from the wireless terminal to the wireless network is suspended in response to a determination that one of a user-level condition, the user-channel condition and the network-level condition is no longer satisfied. Content upload may be resumed if it is determined that the user channel condition or network channel condition that was no longer satisfied is re-satisfied. Content can be downloaded in a similar fashion with initiation of a test call at a user terminal triggered by user-level state information indicating considered conditions are appropriate, followed by download of content if user-channel and network-level conditions are satisfied.

In an exemplary apparatus for uploading content user end equipment is enabled with the capability to test for a possible upload based on optimal radio and equipment conditions. If user-level state information at a wireless terminal indicates the wireless terminal is in an optimal state for uploading content, a test call from the user terminal to the wireless network is initiated. During the test call, information regarding the condition of the user channel and network traffic conditions is received and checked for high bandwidth availability. If predetermined conditions are satisfied, the wireless terminal uploads content without degrading the network and wireless accessibility for other subscribers.

One exemplary user terminal includes a first module for initiating a test call to a wireless network in response to an indication to upload content from the user terminal; a second module for obtaining user-channel information associated with the test call and network-level state information during the test call; a third module for determining whether a user-channel condition is satisfied based on the user-channel information; a fourth module for determining whether a network-level condition is satisfied based on the network-level state information; and a fifth module for uploading the content to the wireless network in response to the user-channel condition and the network-level condition being satisfied.

Another exemplary user terminal further includes a sixth module for triggering the indication to upload content if, based on user-level state information, a user-level condition is satisfied. The sixth module may wait a predetermined period of time when the user-level condition is not satisfied before rechecking the user-level state information against the user-level condition.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the present invention, and wherein.

DETAILED DESCRIPTION

Figure 1:
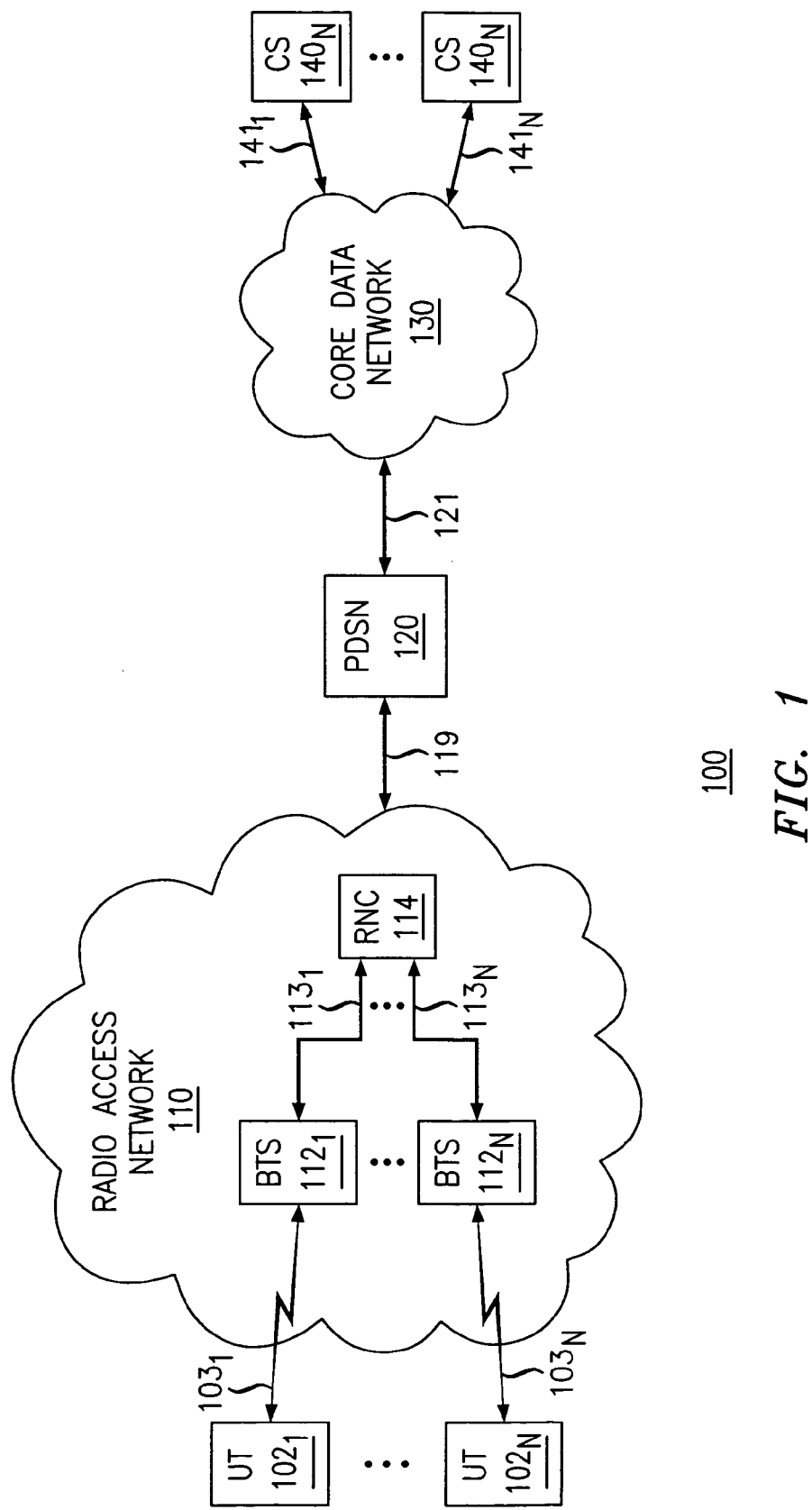
FIG. 1 illustrates a high-level block diagram of a communication network.

Various example embodiments will now be described more fully with reference to the accompanying figures. Specific structural and functional details disclosed herein are merely representative for purposes of describing example embodiments. Example embodiments may be embodied in many alternate forms and should not be construed as limited to only the embodiments set forth herein.

Unless otherwise defined, all terms (including technical and scientific terms) used herein have the same meaning as commonly understood by one of ordinary skill in the art to which example embodiments belongs. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

It will be understood that, although the terms first, second, etc. may be used herein to describe various elements, these elements should not be limited by these terms since such terms are only used to distinguish one element from another. For example, a first element could be termed a second element, and, similarly, a second element could be termed a first element, without departing from the scope of example embodiments. The term "and" is used herein in the disjunctive and conjunctive senses to mean any and all combinations of one or more of the associated listed items, and the singular forms "a", "an" and "the" are intended to include the plural forms as well, unless the context clearly indicates otherwise. It should also be noted that in some alternative implementations, the functions/acts noted for exemplary methods may occur out of the order noted in the figures. For example, two figures shown in succession may in fact be executed substantially concurrently or may sometimes be executed in the reverse order, depending upon the functionality/acts involved.

All of the functions described above with respect to the exemplary method are readily carried out by a general purpose computer or digital information processing device acting under appropriate instructions embodied, e.g., in software, firmware, or hardware programming. Alternatively, the described functions may be carried out by a special purpose computer. For example, functional modules can be implemented as an ASIC (Application Specific Integrated Circuit) constructed with semiconductor technology and may also be implemented with FPGA (Field Programmable Gate Arrays) or any other hardware blocks.

A user-centric, user initiated and network-aware technique for dynamically uploading content from a user terminal over a wireless network is provided. The provided methods and apparatuses improve content uploads over wireless networks by uploading content from users according to changing user-level, user channel, and network-level conditions. By seeking to upload content and uploading content from a user terminal only during desirable user-level condition/s at the user-terminal, upload is optimized for the user terminal condition/s, conserving terminal battery consumption. Specifically, a test call is initiated by the user terminal only after it is determined that the user terminal is in a desirable state for content upload. During the test call initiated by the user terminal, the user terminal obtains user-channel and network-level conditions. Content is uploaded from the user terminal only if desirable user-channel and network-level conditions exist for the user-terminal, which again conserves terminal resources. In this manner, user-level, user-channel, and network-level conditions are evaluated using corresponding status information, in order to undertake content upload from users only under desirable conditions and to prevent content from being uploaded from users under undesirable conditions. Thus, user terminal and network efficiency are improved, providing improved performance perceived by all users, including subscribers with the upload capability of the invention as well as subscribers without that capability.

FIG. 1 illustrates a high-level block diagram of a communication network. Specifically, communication network 100 includes a plurality of user terminals (UTs) $102_1$-$102_N$ (collectively, UTs 102), a radio access network (RAN) 110, a packet data serving node (PDSN) 120, a core data network (CDN) 130, and a plurality of content servers (CSs) $140_1$-$140_N$ (collectively, CSs 140). The RAN 110 includes a plurality of base transceiver stations (BTSs) $112_1$-$112_N$ (collectively, BTSs 112) and a radio network controller (RNC) 114. As described herein, UTs 102 support dynamic upload of content to communication network 100, which may include communication of the uploaded content to CSs 140 which aggregate uploaded content.

As depicted in FIG. 1, UTs $102_1$-$102_N$ communicate with BTSs 112 using a plurality of wireless communication links (WCLs) $103_1$-$103_N$ (collectively, WCLs 103), respectively. The BTSs provide radio interfaces for respective cellular regions (omitted for purposes of clarity). The BTSs $112_1$-$112_N$ communicate with RNC 114 using respective communication paths (CPs) $113_1$-$113_N$ (collectively, CPs 113). The PDSN 120 supports communication between RAN 110 and CDN 130 (illustratively, using a communication path (CP) 119 between RNC 114 and PDSN 120 and a communication path (CP) 121 between PDSN 120 and CDN 130). The CSs $140_1$-$140_N$ communicate with CDN 130 using a plurality of communication paths (CPs) $141_1$-$141_N$ (collectively, CPs 141).

UTs 102 include memory for storing content. The UTs store content, such as text content, audio content, image content, video content, multimedia content, and the like, as well as various combinations thereof. For example, content stored by UTs may include text-based information (e.g., a short story, prepared blog posting, written document, and the like), audio clips, still images, animated images, video clips, multimedia clips, and the like, as well as various combinations thereof. The users of user terminals may wish to share their content with other user terminals and content servers. The UT dynamically uploads content, which may include any content available at UT. In other words, the uploaded content may include any information which may be uploaded from a user terminal over a wireless network.

A UT 102 may provide content to other UTs 102 and to CSs 140. The UT uploads content (i.e., controls upload of content from the UT). The UT may upload content to another UT directly using RAN 110 in response to a trigger at the UT. A UT may also upload content to CS 140 directly using CDN 130 and RAN 110 in response to a trigger at the UT. In one embodiment, the UT may upload content using one or more servers (omitted for purposes of clarity) disposed between UT and CS (e.g., disposed within CDN). A UT may provide content using various different content formats depending on factors such as the type of content being provided, the quality of content being provided, the quality-of-service with which the content is provided, the network implementation in which the content is provided, and the like, as well as various combinations thereof.

The CDN supports communication of content from RAN to CS. For example, CDN may be any network, e.g., a public data network, a private data network, and the like, as well as various combinations thereof. The PDSN supports communications between RAN and CDN (i.e., operates as a connection point between RAN and CDN). For example, PDSN may manage Point-to-Point Protocol (PPP) sessions between a UT and the CDN. The RAN, including RNC and BTSs, supports communications between UTs and CDN. The UTs, BTSs, RNC, and PDSN, as well as other components, may store state information utilized by a, UT determine whether to dynamically upload content from one UT to another UT or a CS.

As depicted in FIG. 1, UTs include wireless user terminals operable for communicating wirelessly. A UT transmits wireless signals to BTSs of RAN using one or more upstream channels. The wireless signals transmitted by a UT may include information such as call requests, requests for network state information, service subscription information, control information, content, and the like, as well as various combinations thereof. A UT receives wireless signals from BTSs of RAN using one or more downstream channels. The wireless signals received by a UT may include information such as network state information, channel information, service subscription information, and the like, as well as various combinations thereof. UTs may include wireless user terminals such as mobile phones, personal digital assistants, and the like.

A UT uploads content over upstream wireless channels. A UT may include one or more user interfaces (e.g., keypads, microphones, camera, and the like) enabling associated users to both generate and select content for upload. UTs may store at least a portion of generated content for later review and upload. UTs may also present content to the user. Thus, UTs may include one or more user interfaces (e.g., display screens, speakers, and the like) for presenting content to the user and enabling the user to interact with the content (e.g., play the content, pause the content, etc.). Content presented to the user includes self-generated content and content received from another source that may be stored for later sharing. For example, a UT may receive and process at least a portion of received content for immediate presentation while at least a portion of the received content is stored for later upload.

UTs transmit information over upstream wireless channels. UTs transmit content for delivery and storage in the network. A UT initiates a test call based on user-level state information in order to obtain upstream channel information and network information for use in dynamically uploading content from the UT. For example, a UT may transmit a test call based on a user-level condition and obtain user channel information and network information relevant to a potential upload of content at a particular time. The UT may initiate the content upload process periodically (e.g., according to a schedule, in response to periodic requests, and the like), a periodically (e.g., in response to a user request or a user terminal condition being satisfied), and the like, as well as various combinations thereof. The UT only initiates a test call if the user-level information at the UT indicates an optimal user-level condition, thereby conserving UT resources.

As depicted in FIG. 1, communication network 100 is adapted for dynamically uploading content from UTs 102 to CSs 140 and other UTs. A UT dynamically uploads content from the UT to a CS using state information obtained from various network components. Specifically, a UT dynamically uploads content from the UT to a CS based on combinations of user-level state information, user channel information and network-level state information obtained from one or more of the uploading UT 102, other UTs 102, CSs 140, PDSN 120, RNC 114, and BTSs 112 (or any other components from which such state information is available). The operation of UT in performing the dynamic content uploading functions of the present invention is depicted and described herein with respect to FIG. 1-FIG. 2.

The UT dynamically uploads content by activating and later deactivating content uploads from the user terminal to wireless network based on both states that vary within the UT and states that vary over the wireless network. The UT device dynamically activates content uploads by periodically evaluating one or more of its conditions. If the UT is in a satisfactory condition, the UT initiates a test call to solicit channel state and network state information. The UT evaluates conditions using the channel state and network state information obtained during the test call and initiates upload of content from the UT such evaluation is determined to be satisfactory. The operation of a UT in dynamically uploading content may be better understood with respect to FIG. 2.

The UT dynamically uploads content by first evaluating conditions of the user terminal represented by user terminal state information. User terminal state information is local terminal state information (i.e., state information stored within the UT). The user terminal state information may include one or more of a power state of the user terminal (e.g., whether the user terminal is in an active state or a dormant state), a battery status of the user terminal (e.g., an indication as to an amount of battery power available at the user terminal), a time-of-day status of the user terminal (e.g., an indication as to whether the time of day is one in which calls are expected to be received at the user terminal), a location status of the user terminal (e.g., whether the user terminal in local call zone), and the like, as well as various combinations thereof. The user terminal information may include terminal capability status information identifying the status one or more terminal capabilities associated with the user terminal (e.g., a memory status of the user terminal (e.g., an indication of the amount of content stored at the user terminal for upload).

Based on whether the user terminal information reveals that an associated condition is satisfied, the user terminal initiates a test call to the network. The test call may be a low data rate call, e.g. 8 kbps I/B, to poll the content server or user terminal to which data is to be uploaded. From the test call, the UT gathers user channel state information and network state information. Network-level information may include information related to the content server that is to receive uploaded content from the user terminal. For example, the network level information, e.g., received via a ok message, may indicate that the content server is not available for an unspecified reason or for specified reason, e.g. as a result of being overloaded. As another example, the CS may decide to not allow an Upload at that time based on the other activities at the CS. Similarly, network level information may include information related to the status of another UT to which content is to be uploaded. The network-level state information may also include network status information. For example, the network-level information may include cell load information (i.e., an indication as to the current utilization of the cellular region with which the user terminal is associated), network resource utilization information, and the like, as well as various combinations thereof. The user channel information includes information associated with the user channel establish by the user terminal during the test call. The user channel information provides an indication of the quality of the user channel (e.g., user channel state information). For example, the user channel information may indicate a received radio signal strength for the test call. If the network-level information and user channel information indicate that conditions are favorable for content upload, the UT proceeds with content upload. Thus, network-level information and user channel information obtained during the test call is checked before going ahead and using up valuable network resources needed for setting up the upload call. For example, the UT may initiate a packet call for content upload with a separate Packet Data Protocol (PDP) Context Subscription/ Access Point Name (APN) to distinguish the content upload call. Alternatively, ones of the network level conditions, e.g., the cell load information, may be checked in the call during the upload request. For example, the RNC may use existing Call Admission Control (CAC) to include feedback on cell loading. In that instance, instead of sending actual cell load data to the UT, the RNC uses the cell load information to admit the call for the content upload and conveys cell load information through allowance or denial or the request for upload. The test call and upload of content may be considered as a part of a single Multiple PDP call with the check of a portion of the network level conditions, e.g., cell utilization, occurring just prior to the request for content transfer itself. In one embodiment, UT may upload content based on evaluation of one or more conditions using associated state information.

The UT may continue to periodically obtain user-level, network-level and user-channel state information during the actual content upload for use in determining how to proceed with the content upload (i.e., as long as content is being uploaded from the user, the UT may continuously re-evaluate conditions and determine whether to deactivate or re-activate uploading the content from the user). In other words, during a content upload, the UT may periodically re-evaluate one or more user-level condition/s, network-level condition/s and channel condition/s, using associated user-level state information, network-level state information and channel state information, in order to prevent and deactivate content uploads from users under undesired condition/s and re-activate content uploads from users under desired condition/s. The UT may also continuously re-evaluate conditions associated with corresponding user-level state information and end a content upload if conditions become unsatisfactory. Content can be downloaded in a similar fashion with initiation of a test call at a user terminal triggered by user-level state information indicating considered conditions are appropriate, followed by download of content if user-channel and network-level conditions are satisfied.

The UT obtains state information from various sources. For example, subscription information concerning services the user utilizes, and the like, may be stored and managed on CS. Portions of the subscription information may also be stored on the UT. Subscription information may include any information specified by the user with respect to content service/s subscribed to by the user. The user subscription information may identify content types the user shares, a level of quality of content the user offers, the quality-of-service with which content of the user is to be uploaded from the user, and the like, as well as various combinations thereof. The subscription information may include any other information associated with the user.

Other information may be obtained from one or more conventional network components (e.g., on one or more of PDSN, RNC, BTSs, and the like, as well as various combinations thereof). For example, the UT may obtain cell load information from one or both of the RNC and BTSs (i.e., from the BTS serving UT). As another example, the UT may obtain user channel quality information from one or more of RNC, BTSs (i.e., from the BTS serving the UT). Conventional network elements need not be modified for the UT to acquire the user channel and network-level state information.

The conditions by which dynamic upload of content from a user should be undertaken may be represented as a dynamic content upload schedule associated with the user and stored as user-level information at the UT. In one embodiment, dynamic content upload schedules may be unstructured (i.e., each dynamic upload schedule is an association of information includes one or more parameters according to which content is to be upload from the UT). In one embodiment, dynamic content upload schedules may be structured. For example, structured dynamic content upload schedules may include be stored as records including one or more fields including one or more parameters according to which available content is to be uploaded from the UT.

The dynamic content upload schedule may include the time at which the content is to be uploaded from the user (typically a time at which a determination is made that one or more conditions is satisfied such that content should be uploaded, or a time close thereto). The dynamic content upload schedule may include a quality-of-service with which the identified content is to be uploaded from the user. The dynamic content upload schedule may include at least a portion of the user-level state, channel state and network-level state information used to evaluate conditions for determining whether to activate or deactivate content uploads. The dynamic content upload schedule may include more or less information as required.

Although primarily depicted and described herein within the context of a specific type of wireless network (illustratively, 3GPP-based EVDO or HSDPA wireless networks), the dynamic content upload functionality may be implemented in various other types of wireless networks. For example, the dynamic content upload functionality may be implemented in Universal Mobile Telecommunications System (UMTS) wireless networks, General Packet Radio Service (GPRS) wireless networks, and the like, as well as various combinations thereof. The present invention is not limited by the generation of wireless network (e.g., 2G, 2.5G, 3G, 4G, and the like, as well as various combinations thereof or the type of wireless network.

Since, as described herein, the invention is not limited to implementation in 3GPP-based wireless networks, although primarily depicted and described herein within the context of a 3GPP-based wireless network in which state information is available from BTSs, RNCs, and PDSNs, the UT may obtain channel and network-level state information from any network components from which such state information is available. For example, in UMTS and GPRS wireless networks, network-level state information and user-level state information may be obtained from Serving GPRS Support Node (SGSN) and/or GPRS Gateway Support Node (GGSN) components, although information available from such components may vary depending on wireless network type since such components often perform different functions in different types of wireless networks.

Figure 2:
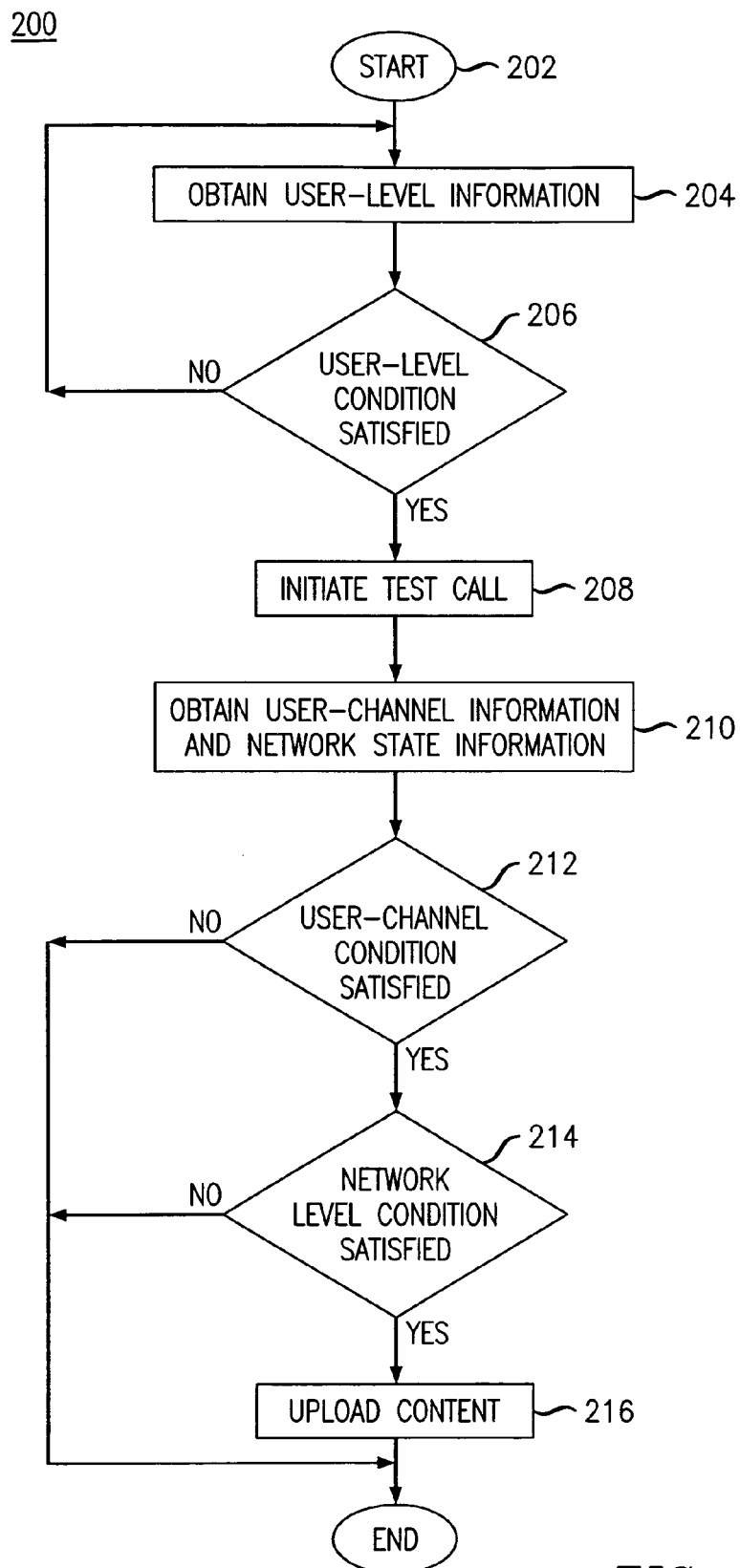
FIG. 2 illustrates a method according to an exemplary embodiment of the present invention.

FIG. 2 illustrates a method according to an exemplary embodiment of the invention. Specifically, method 200 of FIG. 2 includes a method for dynamically uploading content from a user terminal. Although depicted and described as being performed serially, at least a portion of the steps of method 200 of FIG. 2 may be performed contemporaneously, or in a different order than depicted and described with respect to FIG. 2. The method 200 begins at step 202 and proceeds to step 204.

At step 204, the user terminal obtains user-level state information. User-level state information may include information such as user terminal power state values, user terminal battery values, user terminal memory values, user terminal content file information, user terminal capability information, and the like, as well as various combinations thereof.

Prior to start 202 or step 204, the predetermined user-level conditions under which the UT will proceed to initiate a test call for upload may be established. The user may schedule the UT for the content upload service using any service scheduling techniques. In one embodiment, the user may create a dynamic content upload schedule. The user's dynamic content upload schedule may include personal information associated with the user. The dynamic content upload schedule may include user subscription information identifying a content server to which the content that is to be uploaded (and types of content that the user may be interested in uploading), the time/s at and calling location from which the user plans to (or expects to) upload the content, a quality-of-service with which the user expects the identified content to be uploaded, and the like, as well as various combinations thereof. Based on the dynamic content upload schedule, the UT dynamically uploads content from the user (including dynamically initiating, activating, deactivating, and preventing content upload). Portions of the dynamic content upload schedule may be pre-established and fixed by the UT's wireless service provider. For example, the wireless service provider may fix a quality of service and data rate based on agreed upon terms associated with a calling plan so that a user may only upload contractually suitable conditions.

A dynamic content upload schedule may be created and modified by the user using input devices of the UT or via a computer connected to the UT (e.g., via a home computer, business computer, or any other means of accessing the dynamic content upload schedule). Portions of the dynamic content upload schedule may be provided initially by the network and subsequently updated over time. For example, items of the dynamic content upload schedule may be stored on one or more existing network devices storing user information (e.g., Home Location Registers (HLRs) maintained in the wireless network, one or more databases maintained in the core data network, and the like, as well as various combinations thereof).

At step 206, the UT makes a determination as to whether the user-level state information indicates content should be uploaded. In one embodiment, the UT may determine whether its battery is sufficiently powered to accomplish an upload of a content file sized as is the content file desired to be uploaded. In one embodiment, a user terminal battery power condition may be evaluated using a user terminal battery power status value and a user terminal battery power threshold. The user terminal battery power status value is indicative of the amount of battery power available at the user terminal (or consumed by the user terminal). In this embodiment, a user terminal battery power status value greater than the user terminal battery power threshold (or less than, depending on what the value indicates) may be identified as satisfying the user terminal battery power condition, while a user terminal battery power status value less than the user terminal battery power threshold may be identified as failing to satisfy the user terminal battery power condition (e.g., because it is desirable to upload content to users when there is sufficient battery power available at the user terminal such that the content upload does not drain the battery).

In another embodiment, a user terminal power state condition may be evaluated using a user terminal power state value (determined from user-level state information). In one embodiment, two user terminal power state values may be supported, e.g., active and dormant. In one such embodiment, a user terminal power state value indicative that the user terminal is dormant may be identified as satisfying the user terminal state condition (e.g., where the content upload should not interfere with other services utilized by the user). In another such embodiment, a user terminal state value indicative that the user terminal is active may be identified as satisfying the user terminal state condition (e.g., where the user terminal cannot upload content while in a dormant state). In other embodiments, additional user terminal power state conditions may be supported.

In another embodiment, a user terminal memory condition may be evaluated using a user terminal memory status value and a user terminal memory threshold. The user terminal memory status value is indicative of the amount of memory space available at the user terminal (or consumed by the user terminal). In this embodiment, a user terminal memory status value greater than the user terminal memory threshold (or less than, depending on what the value indicates) may be identified as satisfying the user terminal memory condition, while a user terminal memory status value less than the user terminal memory threshold may be identified as failing to satisfy the user terminal memory condition (e.g., because it is desirable to upload content from a UT when there is insufficient memory space available to store additional content created at the UT).

Although primarily described with respect to evaluating conditions using a condition value and a condition threshold, each condition may be evaluated in any manner providing an indication as to whether that condition is satisfied for purposes of deciding whether to initiate a test call. In one embodiment, conditions may be evaluated by comparing actual condition values with desired condition values found in the dynamic content upload schedule. For example, for the terminal state condition, an actual terminal state value (i.e., whether the user terminal is active or dormant) may be compared to a desired terminal state value (e.g., content should only be pushed when the user terminal is active). In one embodiment, multiple condition values and associated condition thresholds may be evaluated in order to determine whether a condition is satisfied for purposes of deciding whether to initiate a test call.

Although primarily described with respect to static determinations as to whether conditions are satisfied (e.g., for a given condition the same condition threshold, or other standard by which the given condition is evaluated, is used in all situations), in one embodiment, at least a portion of the evaluated conditions may be evaluated dynamically. In this embodiment, the requirement/s according to which a condition is evaluated (i.e., standard/s by which the determination as to whether a condition is satisfied is made, e.g., thresholds, specific values, and the like) may vary dynamically. For example, the standard/s according to which a condition is evaluated may vary dynamically depending on one or more factors, such as underlying network technology, results from evaluation of other condition/s, and the like, as well as various combinations thereof.

The number of user-level conditions evaluated and requirements for determining whether conditions are satisfied may be pre-determined and be stored on the UT in the dynamic content upload schedule. The conditions evaluated in order to determine whether or not to initiate a test call from the user terminal may include one or more conditions corresponding to the available user-level state information.

If the user-level state information indicates a test call should be initiated, method 200 proceeds to step 208 where the UT initiates a test call with the network. However, if the user-level state information indicates a test call should not be initiated, method 200 remains within step 206 (i.e., method 200 remains within step 206 until an indication that conditions are favorable for content upload). Thus, communication between the UT and the network for the purpose of uploading content from the UT is only undertaken if the UT is in an appropriate condition, thus minimizing waste of UT and network resources.

At step 208, the UT initiates a test call to the wireless network. At step 210, the UT obtains user-channel information for the test call and network-level state information for the user terminal. The user-channel information and network-level state information may include information such as user channel quality values, CS status indicators, other UT status indicators, cell load values, and the like, as well as various combinations thereof. This information may be obtained from one or more network components. The user-channel information and network-level state information, as well as various sources of the state information and manner in which state information may be obtained, is described herein within the context of the communication network (i.e., with respect to FIG. 1).

At step 212, a determination is made as to whether a user-channel condition/s is satisfied. The determination as to whether the user-channel condition/s is satisfied is performed using the user-channel information associated with the test call. In one embodiment, a user-channel quality condition may be evaluated using a user channel quality value (determined from user-level state information) and a user-channel quality threshold. The user-channel quality value is indicative of a level of quality of the test call user channel. In this embodiment, a user-channel quality value greater than the user-channel quality threshold may be identified as satisfying the user-channel quality condition, while a user-channel quality value less than the user channel quality threshold may be identified as failing to satisfy the user channel quality condition (e.g., because it is desirable to upload content to users when the test call channel quality is high, such that the content is uploaded from the user terminal faster and, therefore, user terminal battery power and other resources are conserved).

A user-channel condition may be evaluated in any manner providing an indication as to whether that condition is satisfied for purposes of deciding whether to activate content upload. In one embodiment, conditions may be evaluated by comparing actual condition values with desired condition values found in the dynamic content upload schedule. In one embodiment, multiple condition values and associated condition thresholds may be evaluated in order to determine whether a condition is satisfied for purposes of deciding whether to initiate content uploads. If the user-channel condition is satisfied, the method continues with step 214, else the method ends at step 218.

At step 214, a determination is made as to whether a network-level condition/s is satisfied. The determination as to whether the network level condition/s is satisfied is performed using the network-level state information received during the test call. One exemplary network-level condition which may be evaluated is the status of the content server that is scheduled to receive uploaded content from the user terminal. In one embodiment, the UT receives a message which indicates whether the content server is available to receive uploaded content (e.g., status ok or status not ok). The content server status message may indicate the reason for any unavailability (e.g. currently overloaded or otherwise busy based on other CS activities). Based upon an unavailability message, the UT may determine a schedule for reattempting content upload. Another exemplary network-level condition which may be evaluated is an estimated upload time condition. In one embodiment, the estimated upload time condition may be evaluated using a estimated upload time value and a estimated upload time threshold. The estimated upload time value is indicative of an amount of time required to upload the desired content to the content server. In this embodiment, a estimated upload time value less than the estimated upload time threshold may be identified as satisfying the estimated upload time condition, while a estimated upload time value greater than the estimated upload time threshold may be identified as failing to satisfy the estimated upload time condition (e.g., because it is desirable to upload content from a user only when the upload will take a limited time, such that other user activity is not impacted).

Another exemplary network-level condition which may be evaluated is a cell utilization condition. In one embodiment, the cell utilization condition may be evaluated using a cell utilization value and a cell utilization threshold. The cell utilization value is indicative of a level of utilization (i.e., load) of wireless resources of the associated cellular region for the test call. In this embodiment, a cell utilization value less than the cell utilization threshold may be identified as satisfying the cell utilization condition, while a cell utilization value greater than the cell utilization threshold may be identified as failing to satisfy the cell utilization condition (e.g., because it is desirable to upload content from a user when the cell in which the user terminal communicates is not loaded, such that other users in the cell are not impacted by the content being uploaded from that user).

A network-level condition may be evaluated in any manner providing an indication as to whether that condition is satisfied for purposes of deciding whether to activate content upload. In one embodiment, conditions may be evaluated by comparing actual condition values with desired condition values found in the dynamic content upload schedule. In another embodiment, a positive/negative status indicator may be considered. In one embodiment, multiple condition values and associated condition thresholds may be evaluated in order to determine whether a condition is satisfied for purposes of deciding whether to initiate content uploads. If the network-level condition is satisfied, the method continues with step 216, else the method ends at step 218.

Although primarily described herein with respect to evaluation of specific conditions, various other conditions may be evaluated in order to determine whether to initiate a test call and activate content uploads. For example, if five conditions are evaluated for one of the user-level information, user channel information and network-level information, a determination that all five evaluated conditions are satisfied may be required to continue the next step of the method. In another embodiment, a subset of the evaluated conditions must be satisfied in order to continue with the next step of the method. For example, if five conditions are evaluated, a determination that at least three of the five evaluated conditions are satisfied may be sufficient.

At step 216, the upload of content begins. For example, the UT may initiate a packet call for video upload with specific PDP Context Subscription/APN and the network respond in a conventional manner. For instance, based on Subscription/APN, Radio Access Bearer (RAB) Assignment message including an Allocation and Retention Priority (ARP), Quality of Service (QoS) and High Data Rate may be propagated to a RNC, which sets the upload call up with an available data rate. During content upload, the UT may continue to monitor user-level information, user-channel information and network level information and terminate, suspend or re-initiate the content upload in response to the continued satisfaction/dissatisfaction of conditions corresponding to the monitored information. For the actual upload of content process, no changes are required to the existing network elements or existing standard by which such network elements operate, and issues such as user mobility/roaming are easily dealt with. For example, the network may prioritize the upload of content according to a comparison of the UT attempting content upload to uses by other UTs in the wireless network.

At step 218, method 200 ends; however, although depicted and described as ending for purposes of clarity, method 200 continues to operate in order to dynamically upload content from a user terminal via the wireless network according to the dynamic content upload schedule. As described herein, user terminal conditions are continuously monitored. However, a test call is only initiated under appropriate user-level conditions in order conserve UT and network resources by pursuing content uploads only under desirable conditions and avoiding resource waste under undesirable conditions. In such embodiments, battery drain associated with unnecessary terminals communication is minimized, impact on other user terminals is minimized, and overall network performance is improved (e.g., TCP performance may be enhanced using lower layer information, under-utilized backhaul resources are utilized, and other network performance improvements may be realized). Other than the UT, existing network elements and existing standard/s by which such network elements operate are not required. As further described herein, channel information for the test call and network-level state information are obtained during the test call and evaluated prior to proceeding with content upload.

Figure 3:
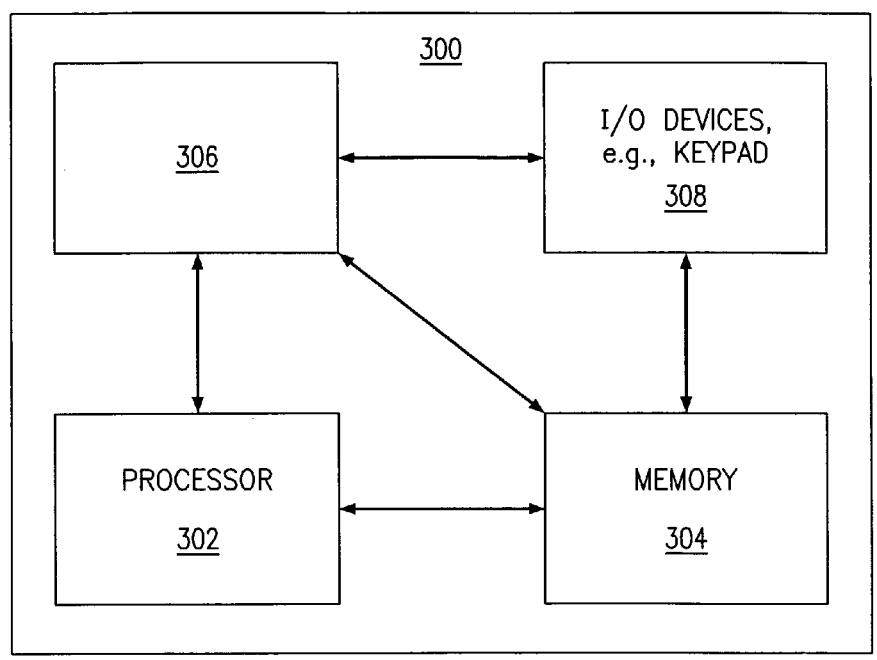
FIG. 3 illustrates a high-level block diagram of a user terminal suitable for performing the functions described herein.

FIG. 3 illustrates a high-level block diagram of user equipment for use in performing the functions described herein. As depicted in FIG. 3, apparatus 300 comprises a processor element 302 (e.g., a CPU), a memory 304, e.g., random access memory (RAM) and read only memory (ROM), a content upload determining-module 306, and various input/output devices 308 (e.g., user input devices including but not limited to keyboard, keypad, touch-screen, microphone, camera, video camera, and the like; storage devices, including but not limited to, a zip drive, a hard disk drive or a compact disk drive; a receiver; a transmitter; a speaker; a display, an input port, an output port, and the like).

It should be noted that the present invention may be implemented in software and/or in a combination of software and hardware, e.g., using application specific integrated circuits (ASIC), a general purpose computer or any other hardware equivalents. Alternatively, a special purpose computer may implement the method of the invention using ASIC, FPGAs and any other hardware block/s. In one embodiment, the content upload determining process of module 306 can be loaded into memory 304 and executed by processor 302 to implement the functions as discussed above. As such, content upload determining process 306 (including associated data structures) of the present invention can be stored on a computer readable medium or carrier, e.g., RAM memory, magnetic or optical drive or diskette, and the like.

It is contemplated that some of the steps discussed herein as software methods may be alternatively implemented within hardware, for example, as circuitry that cooperates with the processor to perform various method steps. Portions of the present invention may be implemented as a computer program product wherein computer instructions, when processed by a computer, adapt the operation of the computer such that the methods and/or techniques of the present invention are invoked or otherwise provided. Instructions for invoking the inventive methods may be stored in fixed or removable media, transmitted via a data stream in a broadcast or other signal bearing medium, and/or stored within a working memory within a computing device operating according to the instructions.

For example, in one exemplary apparatus, the content upload determining module may include a first module for initiating a test call to a wireless network in response to an indication to upload content from the apparatus; a second module for obtaining user-channel information associated with the test call and network-level state information during the test call; a third module for determining whether a user-channel condition is satisfied based on the user-channel information; a fourth module for determining whether a network-level condition is satisfied based on the network-level state information; and a fifth module for uploading the content to the wireless network in response to the user-channel condition and the network-level condition being satisfied. Further embodiments of the apparatus may also include a sixth module for triggering the indication to upload content if, based on user-level state information, a user-level condition is satisfied. When the user-level condition is not satisfied, the apparatus may wait a period of time before rechecking the user-level state information against the user-level condition/s.

Although various embodiments which incorporate the teachings of the present invention have been shown and described in detail herein, those skilled in the art can readily devise many other varied embodiments that still incorporate these teachings.

What is claimed is:

1. A method for dynamically uploading content from a user terminal in response to a request triggered at the user terminal to upload content from the user terminal, the method comprising:

initiating at the user terminal a test call on a test call user channel to a wireless network in response to an indication to upload content from the user terminal, the test call being a low data rate call for polling a content server or a second user terminal to which the content is to be uploaded;

obtaining at the user terminal during the test call user-channel information for the test call and network-level state information for use by the user terminal, wherein the user-channel information comprises a user channel quality value indicative of a level of quality for the test call user channel over which the content is to be uploaded, and wherein the network-level state information comprises at least one of:

status information associated with the content server to which the content is to be uploaded; or status information associated with the second user terminal to which the content is to be uploaded;

determining at the user terminal whether a user-channel condition is satisfied based on the user-channel information;

determining at the user terminal whether a network-level condition is satisfied based on the network-level state information;

uploading the content from the user terminal to the wireless network over the test call user channel to the content server or the second user terminal in response to the user-channel condition and the network-level condition being satisfied; and preventing uploading of the content from the user terminal to the wireless network over the test call user channel to the content server or the second user terminal in response to the user-channel condition and the network-level condition not being satisfied.

2. The method of claim 1 further comprising:

obtaining at the user terminal user-level state information for the user terminal;

determining whether a user-level condition is satisfied based on the user-level state information; and triggering the indication to upload content from the user terminal if the user-level condition is determined to be satisfied.

3. The method of claim 2, wherein determining whether the user-level condition is satisfied comprises at least one of:

determining whether a user terminal power state condition is satisfied;

determining whether a user terminal battery condition is satisfied;

determining whether a user time-of-day condition is satisfied;

determining whether a user terminal location condition is satisfied;

determining whether a user terminal memory condition is satisfied; or determining whether a user terminal capability condition is satisfied.

4. The method of claim 2, wherein the user-level state information comprises at least one of a user terminal power state, a user terminal battery power status, a user terminal time-of-day status, a user terminal location status, a user terminal memory status, a user terminal capability status, or user subscription information for the user terminal.

5. The method of claim 1, wherein determining whether the user-channel condition is satisfied comprises:

determining whether a user channel quality condition is satisfied by the test call.

6. The method of claim 1, wherein obtaining user-channel information for the test call and network-level state information for the user terminal during the test call comprises:

receiving network-level state information at the user terminal from the wireless network.

7. The method of claim 1, wherein determining whether the network-level condition is satisfied comprises at least one of:

determining whether a condition of the content server to which the content is to be uploaded is satisfied; and determining whether a condition of the second user terminal to which the content is to be uploaded is satisfied.

8. The method of claim 1 wherein preventing uploading of the content comprises:

suspending the step of uploading the content to the wireless network in response to a determination that one of a user-level condition, the user-channel condition or the network-level condition is no longer satisfied.

9. The method of claim 8 wherein uploading the content comprises:

resuming the step of uploading the content to the wireless network in response to a determination that the one of the user-channel condition or the network-level condition that was no longer satisfied is re-satisfied.

10. The method of claim 1, further comprising:

in response to the user-channel condition and the network-level condition not being satisfied, waiting a predetermined period of time before re-performing the steps of claim 1.

11. A user terminal for dynamically uploading content in response to a user request triggered at the user terminal to upload content from the user terminal, the user terminal comprising:

a first processor for initiating a test call on a test call user channel to a wireless network in response to an indication to upload content from the user terminal, wherein the test call is a low data rate call for polling a content server or a second user terminal to which the content is to be uploaded;

a second processor for obtaining during the test call user-channel information for the test call and network-level state information for use by the user terminal, wherein the user-channel information comprises a user channel quality value indicative of a level of quality for the test call user channel over which the content is to be uploaded; and wherein the network-level state information comprises at least one of content server information associated with the content server to which the content is to be uploaded or status information associated with the second user terminal to which the content is to be uploaded;

a third processor for determining whether a user-channel condition is satisfied based on the user-channel information;

a fourth processor for determining whether a network-level condition is satisfied based on the network-level state information;

a fifth processor uploading the content from the user terminal to the wireless network over the test call user channel to the content server or the second user terminal in response to the user-channel condition and the network-level condition being satisfied and preventing uploading of the content from the user terminal to the wireless network over the test call user channel to the content server or the second user terminal in response to the user-channel condition and the network-level condition not being satisfied.

12. The user terminal of claim 11 further comprising:

a sixth processor for triggering the indication to upload content if, based on user-level state information, a user-level condition is satisfied.

13. The user terminal of claim 12, wherein the sixth processor is adapted to waiting a predetermined period of time if the user-level condition is not satisfied before rechecking the user-level state information against the user-level condition.

14. The user terminal of claim 11, wherein the user-level state information comprises at least one of a user terminal power state, a user terminal battery power status, a user terminal time-of-day status, a user terminal location status, a user terminal memory status, a user terminal capability status, or user subscription information for the user terminal.

15. The user terminal of claim 11 wherein the fifth processor is adapted to suspend upload of the content to the wireless network in response to a determination that one of a user-level condition, the user-channel condition or the network-level condition is no longer satisfied.

16. The user terminal of claim 11 wherein the fifth processor is further adapted to resume the upload of the content to the wireless network in response to a determination that the one of the user-channel condition or the network-level condition that was no longer satisfied is re-satisfied.

17. The user terminal of claim 11, wherein the network-level state information comprises cell utilization information for a cellular region associated with the user terminal during the test call.

18. The method of claim 1, wherein the network-level state information comprises:
 cell utilization information for a cellular region associated with the user terminal during the test call on the data channel.

19. The method of claim 1, wherein the test call is a Packet Data Protocol call.

* * * * *